United States Patent [19]
Courtot et al.

[11] 3,743,326
[45] July 3, 1973

[54] RELEASABLE TUBE COUPLING

[75] Inventors: Louis B. Courtot, Euclid; Richard H. Dickinson, Jr., Shaker Heights, both of Ohio

[73] Assignee: The Weatherland Company, Cleveland, Ohio

[22] Filed: May 10, 1972

[21] Appl. No.: 252,043

[52] U.S. Cl............ 285/105, 285/113, 285/257, 285/323, 285/382.7
[51] Int. Cl..................... F16l 17/00, F16l 33/16
[58] Field of Search.............. 285/113, 105, 104, 285/102, 101, 100, 257, 382.7, 323, 343, 308, 322, 249

[56] References Cited
UNITED STATES PATENTS

| | | | |
|---|---|---|---|
| 3,653,689 | 4/1972 | Sapy et al. | 285/322 X |
| 2,351,363 | 6/1944 | Parker et al. | 285/382.7 X |
| 3,498,647 | 3/1970 | Schroder | 285/343 |
| 2,695,796 | 11/1954 | Woodling | 285/382.7 X |
| 2,693,374 | 11/1954 | Wurzburger | 285/382.7 X |
| 3,248,136 | 4/1966 | Brozek et al. | 285/382.7 X |
| 2,466,526 | 4/1949 | Wolfram | 285/382.7 X |
| 3,097,866 | 7/1963 | Iversen | 285/257 X |
| 3,384,392 | 5/1968 | Gilchrist | 285/105 |

FOREIGN PATENTS OR APPLICATIONS

| | | | |
|---|---|---|---|
| 792,136 | 3/1958 | Great Britain | 285/249 |

Primary Examiner—Thomas F. Callaghan
Attorney—Harold F. McNenny, Richard H. Dickinson, Jr. et al.

[57] ABSTRACT

A releasable fluid coupling for connecting a flexible plastic tube to a body member includes a sleeve, a tube gripping collet and an O-ring seal. The collet carries gripping surfaces which engage the outer surfaces of the tube and axial outward movement of the collet causes the collet fingers to grip the tube more tightly because of the engagement of the conical cam surfaces on the sleeve and collet fingers. The collet carries stop means for limiting axial movement of the collet and gripping may take place at two axially separated zones and different conical cam angles impart rotational movement to the ends of the collet fingers to provide different amounts of radial movement for the two axially spaced gripping surfaces.

12 Claims, 7 Drawing Figures

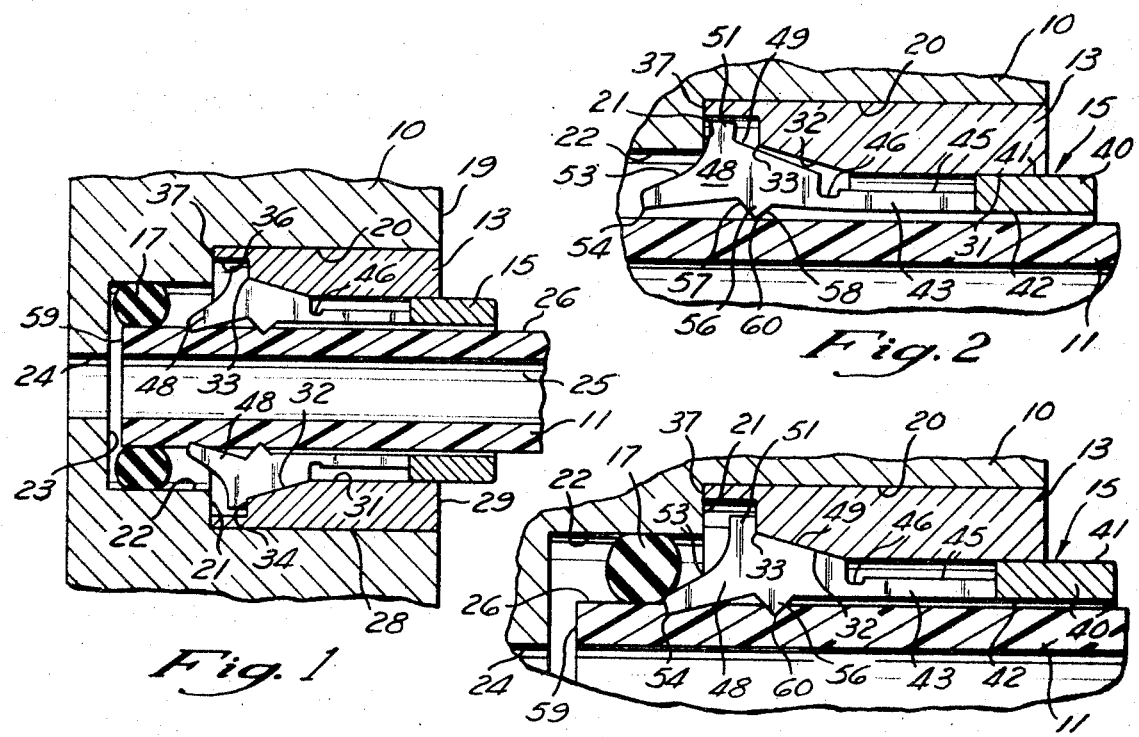
Fig. 1
Fig. 2
Fig. 3
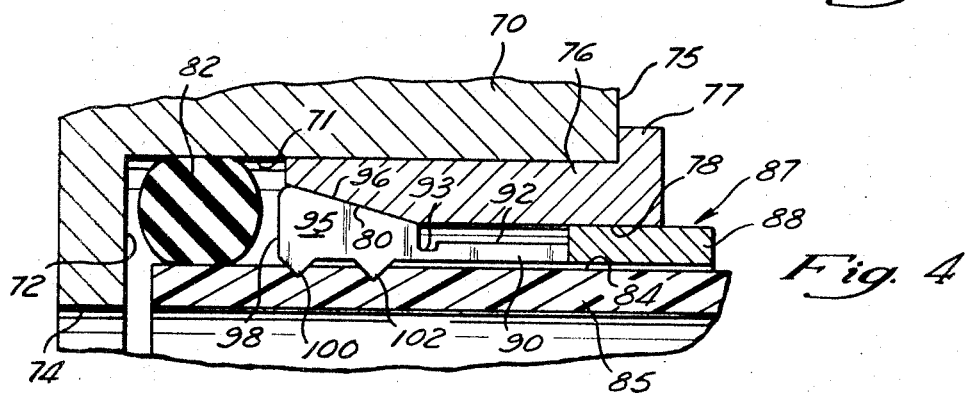
Fig. 4
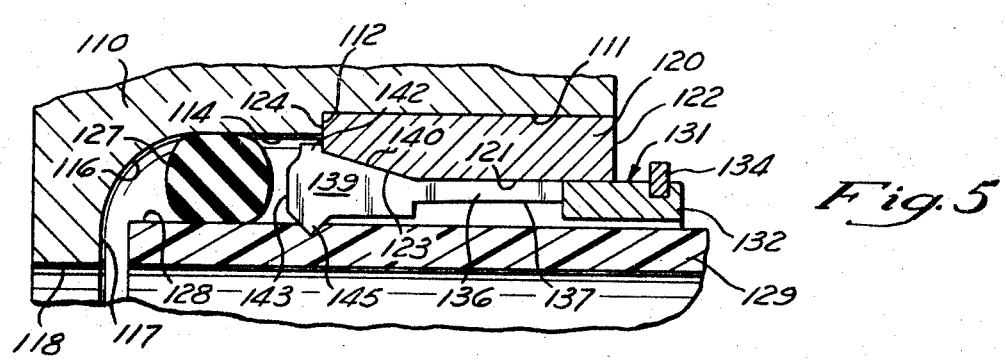
Fig. 5

RELEASABLE TUBE COUPLING

BACKGROUND OF THE INVENTION

The present invention relates generally to fluid couplings for particular use with tubing made from plastic materials of various types such as polyethylene, polypropylene, polyvinyl chloride, nylon and other similar materials which are the flexible or semi-rigid type. Such tubing may be either of the plain extruded homogeneous wall type or may be multi-layer of similar or different materials with or without a reinforcing braid layer. Particular arrangements have been provided to take advantage of the properties of such tubing such as both resilient and plastic deformation of the exterior surface as well as low cost of manufacture and resistance to particular environmental conditions. Although such tubing is generally used in low pressure applications, for example below 200 p.s.i., it is also usable, particularly in the smaller sizes under substantially higher pressures of up to 1000 p.s.i. and beyond for both liquid and pneumatic systems.

Although such tubing can be used, particularly with a rigid internal support, in a variety of standard type fittings also used for soft metallic tubing, such as compression fittings and the like, it has been recognized that such tubing with its particular properties is quite advantageously used with other arrangements which particularly provide easy and rapid connection and disconnection as well as reliable operation under repeated use and adaptability to a wide variety of applications including individual tees, elbows and similar fittings as well as boss type fittings and manifold arrangements.

One type of coupling that has proven to be particularly and advantageously adaptable for use with such plastic tubing is a coupling of the type generally disclosed in U. S. Letters Pat. No. 3,653,689, granted Apr. 4, 1972 to Jacques Sapy and Andre Legris. This type of fitting includes a plurality of members constructed and arranged to be mounted within counterbores on a body member and includes a collar or sleeve member fixedly secured in the body member and arranged to receive a separate collet member having a conical cam surface arranged to cooperate with a similar surface on the sleeve so that axial movement of the collet with respect to the sleeve causes collet fingers to move inward and an annular barb or cutting edge then bites into and grips the outer surface of the tube with increasing force. An O-ring or other type of seal or packing member is located inward of the collet to provide a seal directly between the end of the tube and the body member. With fittings of this type, a plastic tube may be coupled with a simple axial force pushing the tube within and through the collet member to spread the fingers thereof until the tube reaches a stop or bottom position after having made sealing engagement with the sealing ring. In this position, the inner diameter of the barb or gripping portion is normally less than the outer diameter of the tube to provide a light gripping action on the tube to securely position the collet on the tube. Axial outward movement of the tube and collet as a result of fluid pressure will cause the collet fingers to be constricted radially together to provide an increased gripping action on the tube. On the other hand, a tube may be readily released by holding the collet, through its axially outward extension, in a disengaged position with respect to the sleeve and then pulling the tube outward from the collet. The surfaces on the barb gripping surface are arranged so that such axial force, in the absence of an annular constricting force provided by the conical cam surfaces will cause the edge to disengage the tube to permit its easy removal from the coupling.

SUMMARY OF THE INVENTION

The present invention provides, according to a basic feature of the invention, an improved fluid coupling for releasably engaging a tubular conduit with a body member at which includes a sleeve secured in said body and a collet within said sleeve having a gripping surface arranged normally lightly gripped to and having cam surfaces cooperable with cam surfaces on the sleeve to provide an increased gripping force on a tube with outward axial movement of the collet with respect to the sleeve, while a separate sealing ring provides a fluid seal directly between the tube and the body member.

Another feature of this invention provides a coupling according to the basic feature of the invention with an improved gripping means providing separate biting and gripping of the tubing at different axially spaced positions along the tube.

Another important feature of this invention provides an arrangement whereby the collet has at least two axially spaced gripping means in which only a first gripping means normally bites into and engages the tube with a collet in the normal unstressed position, and upon increasing pressure forces constricting the collet into the tube, a second and axially spaced gripping force engages and bites into the tube to increase the gripping action under pressure without increasing the gripping action under zero pressure conditions. This arrangement may also employ a camming arrangement operable by the sealing ring under high pressure conditions to still further increase the gripping action of the collet on the tube.

Another important feature and advantage of this invention is to provide in a coupling of the basic type set forth above arrangements which allow minimum machining and forming of the body member to receive the various fitting members.

Still another important feature of the invention is to provide in a coupling of the basic type set forth above stop means to limit axial movement of the collet with respect to the sleeve. One such stop limits inward travel of the collet towards the sealing ring, and this stop serves not only to prevent damage to the sealing ring by engagement with the collet, but also, by limiting the axial travel of the collet to limit the springback or floating movement of the collet and tube with respect to the sleeve and body member and thereby to minimize the gap between the end of the tube and the body member which must be sealed by a sealing ring. Another type of stop is provided to limit outward movement of the collet with respect to the sleeve so as to positively limit the inward deflection of the annular barb or gripping edge to thereby limit the cutting action on the outer surface of the tube.

Still further features of this invention are arranged in combination with the basic feature to control and limit movement of the sealing ring to prevent extrusion thereof beyond the sealing surfaces which might result in permanent damage to the ring under both high pressure and vacuum conditions.

Still further additional features and advantages of this invention will readily become apparent to those skilled

BRIEF DESCRIPTION OF THE DRAWINGS

Several preferred embodiments of the invention are disclosed by way of example only in the accompanying figures in which:

FIG. 1 is a longitudinal sectional view of a preferred embodiment of the invention after assembly of the tube within the coupling;

FIG. 2 is a fragmentary enlarged sectional view of the coupling shown in FIG. 1 after the tubing has been fully inserted with the collet in its axially innermost position;

FIG. 3 is an enlarged fragmentary sectional view similar to FIG. 2 but showing the coupling in the pressurized condition;

FIG. 4 is an enlarged fragmentary cross-sectional view similar to FIGS. 1–3 but showing another preferred embodiment of the invention;

FIG. 5 is an enlarged fragmentary sectional view showing still another preferred embodiment of the invention;

DESCRIPTION OF THE PREFERRED EMBODIMENTS

Figure 6:
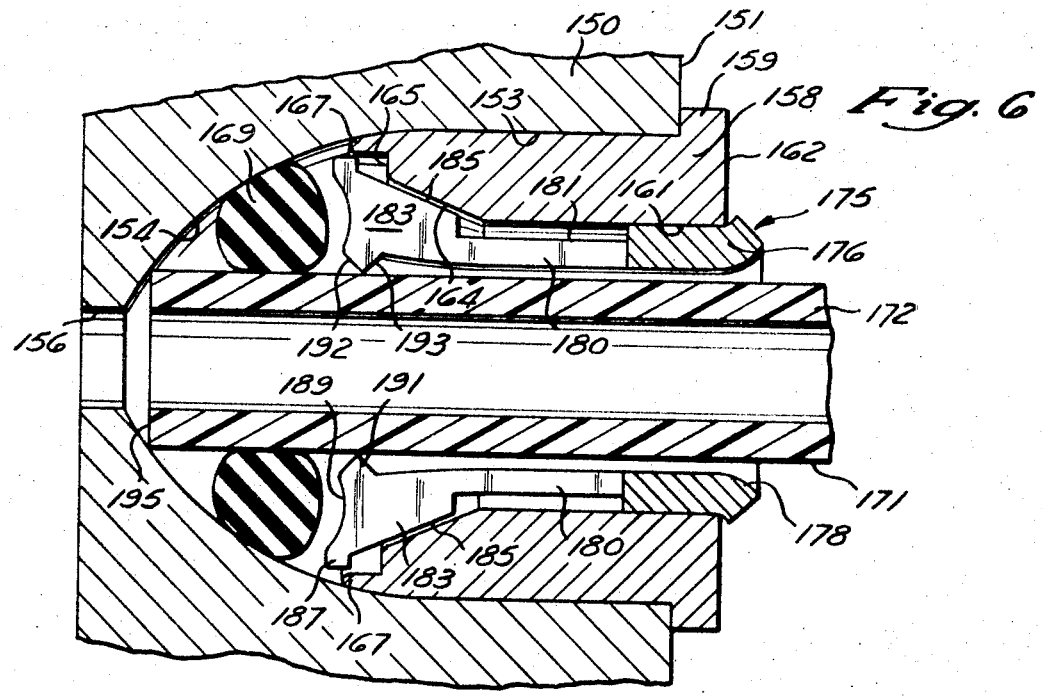
FIG. 6 is a longitudinal cross-sectional view of still another preferred embodiment of the invention showing the tube in the fully inserted position and with the collet in its axially innermost position.

Referring now in greater detail to the embodiment of FIGS. 1 through 3, the fitting therein is shown for connecting to a body member 10 which may be either a fitting, manifold or other device, a tube 11 made of a suitable plastic material such as polyethylene, polypropylene, polyvinyl chloride, nylon or the like, and may be of either the plain homogeneous wall type or of a plurality of layers with or without braid reinforcing. Since further details of the tube are not important to this invention, the tubing in this and other embodiment as shown as being of a homogeneous wall for purposes of clarity and simplicity.

The coupling itself consists of a sleeve or collar member 13, a collet member 15 coaxially received within the sleeve 13 and an O-ring seal 17. The body member 10 is shown as having an outer face 19 onto which opens an enlarged counterbore 20. At its inner end, the counterbore 20 terminates in a radial shoulder 21 to which, in turn, is joined a reduced counterbore 22. In turn, the reduced counterbore 22 terminates at its axially inner end in a shoulder or end face 23 and a reduced passage bore 24 extends from the shoulder 23 through the body member to make suitable connection therein. It will be understood that the counterbores 20 and 22 must be coaxial with each other and the passage bore 24 is preferably, but not necessarily, coaxial with the counterbores 20 and 22. Preferably, the passage bore 24 is of the same diameter as the bore 25 through the tube 11 and the tube 11 in turn has an outer surface 26 having a diameter greater than that of passage bore 24 and less than the diameter of the reduced counterbore 22.

The sleeve 13 is secured within the counterbore 20 either by a press fit of the outer diameter 28 of sleeve 13 being an interference fit with the counterbore 20 or by suitable annular ridges or grooves formed on either surface. Likewise, the sleeve may be secured in place by staking suitable adhesives, welding or any other suitable means.

Preferably, when the sleeve is in place within the counterbore 20, its outer end face 29 is substantially flush or even with the outer face 19 of body member 10, and the sleeve has an axial bore 31 extending axially inward from the outer end face 29 to a point adjacent the inner end where the bore 31 joins a conical camming surface 32 flaring outwardly and inwardly from the bore 31. At its inner end, the conical camming surface 32 terminates in an annular edge 33 at a radial shoulder 34. At its outer end, the radial shoulder 34 joins a counterbore 36 which terminates at the radial inner end face 37 of sleeve 13 which is preferably in abutting contact with the shoulder 21. By having the sleeve 13 have an axial length substantially equal to the depth of the counterbore 20, positive seating of the inner end face 37 against shoulder 21 can be assured when the outer face 29 of sleeve 13 is flush with the outer face 19 of the body member 10.

The O-ring seal 17 is mounted within the space defined by the reduced counterbore 22, shoulder 23 and the outer surface 26 of the tube 11. Preferably, the O-ring seal is proportioned so as to be radially compressed to make positive sealing engagement with both the reduced counterbore 22 and the outer surface 26 of tube 11, while it is free to float in sealing contact axially to and from the shoulder 23, as will be described in greater detail hereinafter.

As shown in greater detail in FIGS. 2 and 3, the collet member 15 has a circumferentially continuous base portion 40 having an outer periphery 41 slidably received within the bore 31 of sleeve 13 and an inner periphery 42 adapted to receive the tube 11 with a clearance fit. The collet has a plurality of finger portions 43 extending axially inwardly from the base portion 40, and such finger portions are preferably formed by machining the collet as an entire unit and subsequently cutting axial slots to separate the finger portions.

To provide increased flexibility of the finger portions 43, they are provided on their exterior surface with a cutaway or relief portion 45 to reduce the radial thickness, and the end of relief 45 is provided an additional and deeper relief cut 46 to provide maximum flexibility at that point.

The finger portions 43 terminate at their inner ends in an enlarged tip portion 48 which includes on its outer periphery a conical cam surface 49. The cam surface 49 is formed with a greater conical angle, when the collet is in its normal or free position, than the conical angle of cam surface 32 of the sleeve 13. Axially inward of the cam surface 49 is a radial flange 51 on the other side of which is a curved tip surface 53 terminating at the extremely inner end in a front cutting edge portion 54 normally having a diameter slightly greater than that of tube 11. On the inner periphery of the collet finger and spaced axially outward from the front cutting edge 54 is sharp V-shaped annular gripping surface or barb 56 having an inner diameter slightly less than the diameter of tube 11 with an axially inner face 57 and an axially outer face 58 intersecting at a sharp edge 60.

The coupling is assembled by first assembling the O-ring seal 17 within the reduced counterbore 22, after which the collet 15 and sleeve 13 are inserted as a unit into the body member 10. The tube 11 is then inserted into the bore 42 in collet 15 without resistance until the inner end 59 of the tube contacts the sloping outer face 58 of the barb 56. Additional axial movement of the tube will then carry the collet 15 axially inward until the radial flange 51 contacts the shoulder 21 to limit further inward movement of the collet. Further force on the tube then causes the tip portion 48 to be resiliently deflected outwardly until the outer surface 26 of the tube 11 can slide past the sharp edge 60 of annular barb 56, past the O-ring seal 17 and bottom on the shoulder 23. When this is done by the simple axial force on the tube, the assembly of the tube in the coupling is complete.

The fitting is so arranged that the annular barb 56, when the collet is in the free state, has a diameter less than the diameter of the outer surface 26 of tube 11 so that the resilient deflection of the finger portions 43 will cause the barb to firmly grip the tube. However, as long as the barb 56 is not penetrated or bitten into the wall of the tube, the front cutting edge 54 will remain out of contact with the tube by a slight clearance.

When an axially outward force is applied to the tube 11 with respect to the body member 10, the tube 11 and collet 15 move as a unit outwardly until the conical cam surface 49 contacts the annular edge 33, whereupon further movement therebetween forces the tip portion 48 radially inward to cause the annular barb 56 to bite into the tube with increasing gripping force. As further movement occurs, the tip portion 48 will tend to flex and rotate about the relief cut 46 until the conical cam surface 49 changes its angle to make surface abutting contact with the conical cam surface 32. As this occurs, the front cutting edge 54 will move through a greater radial distance and begin to bite into the outer surface of the tube to provide an increased gripping action. Maximum axial movement of the collet 15 is determined as shown in FIG. 3 by engagement of the radial flange 51 with the radial shoulder 34 on sleeve 13 to provide a positive stop movement of the collet and limiting inward biting action of the front cutting edge 54 and annular barb 56.

It should be noted that because there is no relative movement between the tube 11 and collet 15, the axial movement of the collet 15 as determined by the movement of the radial flange 51 between the radial shoulders 21 and 34 determines the amount of movement of the inner end face 59 of tube 11 away from the shoulder 23. This controls the axial clearance space between these surfaces which must be sealed by the O-ring seal 17 and limits, particularly under vacuum conditions, the amount of space into which the O-ring seal might extrude or be deformed.

It should be noted that under pressure conditions in the coupling, when the members have assumed the limiting position shown in FIG. 3, the fluid pressure will be communicated to the inner or high pressure side of the O-ring seal 17. This forces the seal axially outward until the seal engages the curved tip 53 of tip portion 48 with a camming action which provides additional gripping and sealing action between the front cutting edge 54 and the outer surface 26 of tube 11.

To remove the tube from the fitting, it is only necessary to mechanically hold the collet 15 in its innermost position as shown in FIG. 2. In this position, the resilient action of the finger portions 43 will allow the front cutting edge 54 to disengage completely from the outer surface of the tube, leaving the tube retained in place only by the annular barb 56. Thus, when an axially outward force is applied to the tube 11, the sloping shape of the inner face 57 of the barb 56 will cause the tip portion 48 to move a slight additional distance outward. This allows the annular barb 56 to ride out of the groove that it may have cut in the outer surface of the tube and the tube may then be easily disengaged from the coupling.

In the embodiment of FIG. 4, the body member 70 is provided with a single bore 71 terminating at its inner end in a radial end wall 72 from which leads a passage bore 74. A sleeve 76 is fitted in the outer end of bore 71, and to limit its inward movement it is provided with a radial flange 77 adapted to abut the outer face 75 of the body member 70.

The sleeve 76 is provided with an axial bore 78 which terminates at its inner end in a conical cam surface 80 similar in configuration to the conical cam surface 32 in the embodiments of FIGS. 1 - 3. An O-ring seal 82 is positioned within the bore 71 inward of the sleeve 76 to make sealing engagement with the bore 71 and the outer surface 84 of the tube 85.

The collet member 87 is, except for the tip portion, substantially similar to the collet described in the earlier embodiment and includes a base portion 88 slidable within the bore 78 and from which extend a plurality of similar finger portions 90. Each of the finger portions 90 includes a reduced diameter relief portion 92 terminating at its inner end in a relief cut 93 so that maximum bending takes place at this point. At the inner end of the finger portion 90 is a tip portion 95 having a conical cam surface 96 on its outer periphery. Preferably, the conical cam surface 96 has a greater conical angle than that of the cam surface 80 to provide a rotational action under outward axial movement until surface abutting contact is made as shown in FIG. 4. The tip portions 95 of each of the finger portions have end faces 98 designed to prevent outward extrusion of the O-ring seal 82 under pressure conditions.

The gripping between the tip portions 95 and the outer surface 84 of tube 85 is done by providing a pair of axially spaced, substantially identically shaped annular barbs 100 and 102. The barbs 100 and 102 have substantially the same angles as that of barb 56 in the embodiment of FIGS. 1 - 3, but in the free state the outer barb 102 will have a lesser inner diameter than that of the inner barb 100 so that when the tube 85 is inserted and its surface engages the outer barb 102, the tip portions 95 will be spread apart and the inner barb 100 will remain out of contact with the outer surface of the tube. However, when the fitting is pressurized or an axial force is applied so that the members move to the position of FIG. 4, the rotation of the tip portion 95 will cause greater radially inward movement of the inner barb 100 than for the outer barb 102 so that in the fully engaged position they both fully penetrate and bite into the tube to provide maximum gripping action at two axially spaced locations.

Again, the tube may easily be released by holding the collet 87 in an inward position so that an axial pull on the tube 85 will cause the outer barb 102 to disengage itself from the outer surface 84 of the tube and allow the tube to be easily withdrawn from the collet.

In the embodiment shown in FIG. 5, the body member 110 is provided with an enlarged counterbore 111 which terminates at its inner end in a radial shoulder 112. An inner bore 114 of reduced diameter extends from the shoulder 112 further into the body where it terminates in an arcuately curved surface 116 forming a transition between that bore and the radial end wall 117. The passage bore 118 extends from the end wall 117 to make such additional fluid connection as desired.

A sleeve 120 is positioned within the enlarged counterbore 111 and has an outer face 122 from which extends a bore 121. At its inner end, the bore 121 terminates in a conical cam surface 123 which, in turn, terminates in a radial end face 124 which abuts against the shoulder 112.

An O-ring seal 127 is positioned within the inner bore 114 to make sealing contact between that bore and the outer surface 128 of tube 129.

A collet 131 is located within the sleeve 120 and has a base portion 132 similar to the collet in the other embodiments. In this case, the base portion 132 is provided with an annular groove to receive a snap ring 134 which is arranged to abut against the outer face 122 of the sleeve 120 to limit axially inward movement of the collet. The collet 131 has a plurality of finger portions 136 extending axially inward from the base portion 132, and in this case the finger portions 136 are relieved at 137 on their inner surfaces to increase the flexibility of the fingers and cause them to pivot about a point having a maximum radial distance from the axis of the tube. The finger portions 136 terminate in tip portions 139 having a conical cam surface 140 on the outer periphery. In this embodiment, it is preferred that the conical cam surface 140 has substantially the same angle as that of the conical cam surface 123 on sleeve 120. The tip portions 139 are also provided, inwardly of the conical cam surface 140, with a radial flange 142 which in the pressurized conditions as shown in FIG. 5 is arranged to engage the inner end face 124 of sleeve 120 to limit axially outward movement of the collet 131 with respect to sleeve 120.

Each of the tip portions 139 has a substantially radial end face 143 to prevent outward extrusion of the O-ring seal 127 under pressure conditions. The tip portions 139 also have an annular barb 145, similar to the barbs 100 and 102 in the embodiment of FIG. 4, arranged to bite into and grip the tube. In this case, the single barb, when the collet is in the unstressed condition, has an inner diameter slightly less than the outer diameter of the tube so that when the tube is inserted into the collet, the end will engage the outer surface of barb 145 and cause the collet and tube to move together as unit until the snap ring 134 contacts the outer face 122. Further movement of the tube until it engages the end wall 117 will cause the tip portions 139 to spread apart in the manner previously described. When the fitting is pressurized, the collet 131 will move outward to cause the tip portions 139 to move radially inward so that the annular barb 145 more tightly grips the tube, only until the radial flange 142 engages the inner end face 124 of sleeve 120. This prevents excessive biting of the barb 145 into the surface of the tube to limit the deformation thereof.

When the fitting is used under pressurized conditions, the fluid pressure on the inner race side of the O-ring seal 127 will move it axially outward until it abuts the end faces 143 of the tip portions 139 to prevent damage to the seal. However, when the fitting is used in vacuum conditions, the O-ring seal 127 will move axially inward until it engages the curved surface 116. Because of the shape of this surface, it provides a seat for the O-ring seal by virtue of its gradual radial compression to prevent possible extrusion of the seal into the space between the end of the tube 129 and the end wall 117.

The tube 129 is disconnected from the fitting in the same manner as the previously described embodiments by holding the collet 131 in its inward position with a snap ring 131 engaging the outer face 122 of the sleeve, whereupon axial pull applied to the tube will cause the annular barb 145 to disengage from the surface of the tube which is then removed from the collet.

Figure 7:
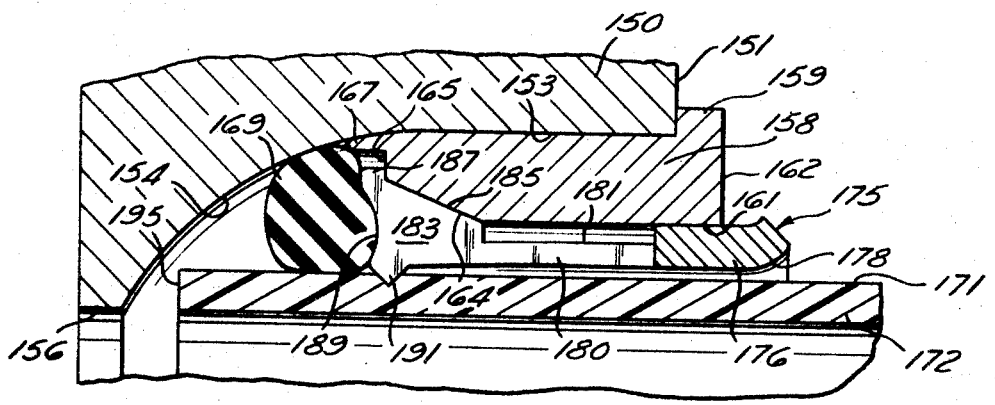
FIG. 7 is a fragmentary cross-sectional view of the embodiment shown in FIG. 6 in the pressurized condition.

FIGS. 6 and 7 show another preferred embodiment of the invention in which the fitting is mounted in a body member 150 having a planar outer face 151. To receive the fitting, the body member 150 has a cylindrical bore 153 extending inward from outer face 151 to join a curved bore 154 which converges inwardly to join, while still inclined to the bore axis, a reduced passage bore 156.

A sleeve or collar 158 is securely fitted within the cylindrical bore 153 and is provided at its outer end with a radial flange 159 adapted to seat against the outer face 151 of body member 150 to positively position the sleeve 158 in bore 153. Sleeve 158 has an outer end face 162 from which extends inwardly a cylindrical bore 161. Bore 161 at its inner end terminates in a conical cam surface 164 which in turn terminates in a radial face 165. A tip portion 167 of sleeve 158 extends axially beyond the radial face 165 and into the curved bore portion 154. It will be appreciated that the tip portion 167 may be formed cylindrically with the rest of the sleeve, and when the sleeve is pressed into the cylindrical bore 153, as the tip portion 167 enters the curved portion, it is swaged inwardly to increase the tightness of the fit of the sleeve 158 in bore 153.

An O-ring seal 169 is located inwardly of sleeve 158 within the curved bore 154 with which it makes sealing contact. O-ring seal 169 also has an inner diameter arranged to make sealing contact with the outer surface 171 of tube 172 to thereby provide a positive seal directly between the tube and the body member.

A collet member 175 is positioned within the sleeve 158 in the same general manner as in the previously described embodiments. Collet 175 also includes, at its outer end, a generally cylindrical continuous base portion 176 which at its axially outer end is flared as at 178 by swaging or spinning to provide a stop engageable against the outer end face 162 of sleeve 158 to limit axially inward movement of collet 175.

The collet 175 has a plurality of finger portions 180 extending axially inward from the base portion 176. Each of these finger portions 180 has along its outer surface a relief cut indicated at 181 to reduce the radial thickness and increase the radial flexibility of the finger portions. At its inner end, each of the finger portions 180 terminates in a radially enlarged tip portion 183. Each of the tip portions 183 is provided on its outer periphery with a conical cam surface 185 having substantially the same conical angle as that of conical cam surface 164 on sleeve 158. At the inner end of conical cam surface 185, the tip portion 183 has a radially outwardly extending flange 187, which on axially outward movement of collet 175 is engageable with the radial face 165 on sleeve 158 to positively limit outward movement of collet 175 with respect to sleeve 158. The end face of tip portion 183 is formed with an annular recess 189 of concave cross-section having a radius of curvature substantially equal to the radius of the O-ring seal 169 so that upon outward axial movement of the O-ring seal 169 under pressure, it is received within the recess 189 in such a manner as to substantially reduce any deformation and cutting or other damage to the O-ring.

At its inner end, the tip portion 183 has an annular barb 191 having a normal diameter when the finger portions 180 are unstressed somewhat less than the diameter of the outer surface 171 of tube 172. The barb 191 is formed with sloping inner surfaces 192 and outer surface 193 as will be described in greater detail hereinafter.

To assemble the tube 172 in the fitting, it is inserted into the collet 175 until the end face 195 of tube 172 contacts the outer surface 193 of annular barb 191. Further force on the tube 172 carries the collet 175 to an axially inward position until stopped by engagement of the flared portion 178 with the outer end face 162 of sleeve 158. Further movement of the tube causes the tip portion 183 to deflect resiliently outwardly so that the annular barb 191 slides over the outer surface of the tube. The tube is then moved axially further inward until the end face 195 contacts the curved bore 154 and the coupling members are in the position shown in FIG. 6. It should be pointed out that when the coupling is used in vacuum conditions, the tube and collet are generally moved into the innermost position and the O-ring seal 169 is forced into the wedge-like space between the outer surface 171 of tube 172 and the curved bore 154.

When the coupling is pressurized, the O-ring seal 169 moves outward into the annular concave recess 189 and the tube 172 and collet 175 move axially outward so that engagement between the conical cam surfaces 185 and 164 causes the tip portions 183 to move radially inward so that the annular barb 191 bites into the outer surface of the tube. Axial movement in this manner is limited by the engagement of the radial flange 187 with the radial face 165 and the coupling members then assume the relationship shown in FIG. 7.

Again, to disengage the tube 172, the collet 175 is held in its inward position as shown in FIG. 6. However, after the coupling has been engaged, the annular V-groove that the annular barb 191 forms in the outer surface 171 of tube 172 may remain so that the annular barb is slightly embedded in the tube. However, because the camming action cannot take place between the surfaces 185 and 164, an axially outward force applied then to the tube 172 causes the barb 191, by virtue of the camming action between the surface 192 and the groove in the tube, to move radially outward so that the tube may be withdrawn from the collet.

While it is recognized that further and additional modifications and rearrangements may be made in the invention, it is recognized that such various modifications and rearrangements will come within the scope of the invention as defined in the following claims.

What is claimed is:

1. A releasable fluid coupling for connecting a flexible resilient tube to a body member having a fluid passage therein comprising an enlarged bore in said body member connecting with said fluid passage, a collet member in said bore adapted to receive and grip a tube received therin, said collet having a base portion surrounding said tube and a plurality of resilient fingers each extending axially inwardly from said base portion and terminating at its inner end in a tip portion, said tip portions having on their outer peripheral surface a first conical cam surface, a second conical cam surface on said body member in said bore and engageable by said first conical cam surface upon axial movement of said collet out of said bore to radially constrict said tip portions, said tip portions on their inner periphery defining an annular gripping means having an internal diameter less than the outer diameter of said tube when said finger portions are in the normal undeflected position, whereby said tube is gripped by said gripping means when said first and second conical cam surfaces are out of engagement with each other, and said collet and said tube are movable axially together in said bore, said bore defining an end wall adjacent said fluid passage engageable by the end of said tube, stop means on said collet and said body member to allow limited axial movement of said tube and collet so that axial movement of said tube into said collet causes said collet to move axially inward until said stop means are engaged and the end of said tube engages said end wall and said first and second cam surfaces are out of engagement, and axially outward movement of said collet and said tube is limited by the engagement of said stop means to limit movement of the end of said tube away from said end wall and to limit the radial constriction of said tip portions, and seal means in said bore axially inwardly of said collet in sealing engagement with the outer surface of said tube and said body member.

2. A releasable fluid coupling as set forth in claim 1 wherein said tip portions have on their inner periphery a second annular gripping means axially inward from said first annular gripping means, said second annular gripping means defining an internal diameter greater than the outer diameter of said tube when said finger portions are in the normal undeflected positions, and axially outward movement of said collet causes radially inward movement of said tip portions whereby both of said gripping means engage the tube at axially spaced locations.

3. A releasable fluid coupling as set forth in claim 1 wherein said body member has an arcuately curved concave surface between said enlarged bore and said end wall and engageable by said seal means to provide progressive radial compression of said seal means as said seal means moves toward said end wall and the end of said tube.

4. A releasable fluid coupling as set forth in claim 1 wherein said tip portions on their axially inner end faces define a concave surface adapted to receive said seal means under pressure conditions to limit outward extrusion of said seal means.

5. A releasable fluid coupling set forth in claim 1 wherein said stop means comprises a radially outwardly extending flange on said tip portions and a pair of axially spaced shoulders on said body member, one shoulder on each side of said flange.

6. A releasable fluid coupling as set forth in claim 1 wherein said stop means to limit outward movement of said collet comprises a radial flange on said tip portions and a radial shoulder on said body member, and said stop means to limit inward movement of said collet comprise a radial projection on said collet base portion engageable with said body member radially outward of said enlarged bore.

7. A releasable fluid coupling as set forth in claim 1 wherein said second conical cam surface is on a sleeve secured in said enlarged bore and said collet is slidably carried in said sleeve.

8. A releasable fluid coupling for connecting a flexible resilient tube to a body member having a fluid passage therein comprising an enlarged bore in said body member connecting with said fluid passage, a collet member in said bore adapted to receive and grip a tube received therein, said collet having a base portion surrounding said tube and a plurality of resilient fingers each extending axially inwardly from said base portion and terminating at its inner end in a tip portion, said tip portions having on their outer peripheral surface a first conical cam surface, a second conical cam surface on said body member in said bore and engageable by said first conical cam surface upon axial movement of said collet out of said bore to radially constrict said tip portions, said tip portions on their inner periphery defining at least two axially spaced annular gripping means, one of said gripping means having an internal diameter less than the outer diameter of said tube when said finger portions are in the normal undeflected position, whereby said tube is gripped by said one gripping means when said first and second conical cam surfaces are out of engagement with each other, and said collet and said tube are movable axially together in said bore, the other of said gripping means being axially inward of said one gripping means and having an internal diameter greater than the outer diameter of said tube when said finger portions are in the normal undeflected position, said other gripping means being engageable with the outer surface of said tube when said tip portions are radially constricted, and seal means in said bore axially inwardly of said collet in sealing engagement with the outer surface of said tube and said body member.

9. A releasable fluid coupling as set forth in claim 8 wherein the conical angle of said first conical cam surface is greater than the conical angle of said second conical cam surface and axially outward movement of said collet produces a rotational movement of said tip portions to bring said first and second conical cam surfaces into surface abutting contact, whereby said other gripping means moves a greater radial distance than said one gripping means.

10. A releasable fluid coupling as set forth in claim 8, including stop means on said collet and said body member to limit axially inward movement of said collet toward said seal means.

11. A releasable fluid coupling as set forth in claim 10, including a second stop means on said collet on said body member to limit axially outward movement of said collet away from said seal means.

12. A releasable fluid coupling as set forth in claim 11 wherein said tip portions include a sloping outer peripheral surface adjacent said other gripping means and engageable by said seal means so that under high pressure conditions engagement of said seal means with said sloping surface increases the radially inward force of said other gripping means against said tube.

* * * * *

UNITED STATES PATENT OFFICE
CERTIFICATE OF CORRECTION

Patent No. 3,743,326　　　　　　　Dated　July 3, 1973

Inventor(s)　Louis B. Courtot and Richard H. Dickinson, Jr.

It is certified that error appears in the above-identified patent and that said Letters Patent are hereby corrected as shown below:

Column 5, line 39, after "stop" insert -- limiting outward -- .

Signed and sealed this 19th day of February 1974.

(SEAL)
Attest:

EDWARD M. FLETCHER, JR.
Attesting Officer

C. MARSHALL DANN
Commissioner of Patents